(12) United States Patent
Mendes De Araujo et al.

(10) Patent No.: US 11,162,585 B2
(45) Date of Patent: Nov. 2, 2021

(54) PISTON HAVING TWO PISTON RINGS

(71) Applicant: MAHLE International GmbH, Stuttgart (DE)

(72) Inventors: Fabio Mendes De Araujo, Waterford, MI (US); Erich John Rabassa, South Lyon, MI (US); Jason Bieneman, Ann Arbor, MI (US); Ashfaque Ahamed, Farmington Hills, MI (US)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 16/263,182

(22) Filed: Jan. 31, 2019

(65) Prior Publication Data

US 2020/0248809 A1 Aug. 6, 2020

(51) Int. Cl.
*F16J 9/20* (2006.01)
*F16J 9/10* (2006.01)

(52) U.S. Cl.
CPC ...... *F16J 9/203* (2013.01); *F16J 9/10* (2013.01)

(58) Field of Classification Search
CPC ...... F16J 9/203; F16J 9/10; F16J 9/206; F02F 5/00
See application file for complete search history.

(56) References Cited

U.S. PATENT DOCUMENTS

| | | | | |
|---|---|---|---|---|
| 1,327,801 A * | 1/1920 | Blache | | F16J 9/062 |
| | | | | 277/543 |
| 2,048,258 A * | 7/1936 | Gordon | | F16J 9/203 |
| | | | | 277/451 |
| 2,213,452 A * | 9/1940 | Paton | | F16J 9/063 |
| | | | | 277/466 |
| 2,798,779 A * | 7/1957 | Swartz | | F16J 9/20 |
| | | | | 277/466 |
| 3,806,137 A * | 4/1974 | Prasse | | F16J 9/06 |
| | | | | 277/468 |
| 3,980,310 A * | 9/1976 | Packard | | B23P 15/06 |
| | | | | 277/466 |
| 4,085,490 A * | 4/1978 | McCormick | | B23P 15/06 |
| | | | | 148/589 |
| 5,752,705 A * | 5/1998 | Plant | | B21D 7/08 |
| | | | | 277/434 |

(Continued)

FOREIGN PATENT DOCUMENTS

| | | | | | |
|---|---|---|---|---|---|
| EP | 0927840 | A1 * | 7/1999 | | F16J 9/062 |
| JP | 08240266 | A * | 9/1996 | | F16J 9/203 |
| JP | 2017116015 | A * | 6/2017 | | F16J 9/206 |

*Primary Examiner* — Eugene G Byrd
(74) *Attorney, Agent, or Firm* — Collard & Roe, P.C.

(57) ABSTRACT

A piston assembly for an internal combustion engine includes a cylinder bore and a piston having exactly two ring grooves, a scraper ring positioned in the upper ring groove, and an oil control ring positioned in the lower ring groove. A constant twist occurs in the scraper ring about a rotational center of the cross-section, the constant twist occurring at each cross-sectional location of the scraper ring about the circumference of the ring and between adjacent free ends of the ring. The oil control ring can be of a multi-segmented U-flex design, with a coil spring mounted in a channel thereof. The combination of the two rings leads to improved sealing and oil control so that the piston can be manufactured with only two rings, thus reducing overall weight and cost.

11 Claims, 9 Drawing Sheets

(56) References Cited

U.S. PATENT DOCUMENTS

| | | | |
|---|---|---|---|
| 6,361,050 B1* | 3/2002 | Sytsma | F16J 9/20 |
| | | | 277/434 |
| 9,915,345 B2* | 3/2018 | Kawase | F16J 9/206 |
| 10,371,086 B2* | 8/2019 | Mendes de Araujo | ................ |
| | | | F02F 3/0015 |
| 2002/0174768 A1* | 11/2002 | Hitosugi | F16J 9/203 |
| | | | 92/172 |
| 2006/0102131 A1* | 5/2006 | Han | F16J 9/12 |
| | | | 123/193.4 |
| 2012/0205876 A1* | 8/2012 | Fujimura | F16J 9/26 |
| | | | 277/442 |
| 2013/0181411 A1* | 7/2013 | Esser | F16J 9/206 |
| | | | 277/443 |
| 2015/0184748 A1* | 7/2015 | Sytsma | F16J 9/06 |
| | | | 277/310 |
| 2015/0240943 A1* | 8/2015 | Meacham | F16J 9/062 |
| | | | 92/153 |
| 2017/0284331 A1 | 10/2017 | Mendes de Araujo et al. | |

* cited by examiner

PISTON HAVING TWO PISTON RINGS

BACKGROUND OF THE INVENTION

1. Field of the Invention

The present invention relates to a piston for a combustion engine, in particular a diesel engine, which has improved performance while minimizing weight and cost. In particular, the piston of the present invention utilizes only two piston rings, each having a structure and shape that provide sufficient lubrication and oil scraping capabilities, so that the compression height of the piston and thus the overall weight of the piston can be reduced.

2. The Prior Art

Internal combustion engine manufacturers are constantly seeking ways to improve the longevity and reliability of their engines. One method of improving an engine's longevity is to include oil control rings on the pistons of the internal combustion engine. Oil control rings perform the functions of minimizing oil consumption while ensuring sufficient lubrication between the piston and the cylinder wall. To minimize oil consumption, the oil control rings scrape oil from the cylinder wall during the downstroke of the piston in the direction of the oil chamber. On the upstroke, the oil control rings slide over the oil to avoid scraping it. The oil control rings ideally maintain a minimal oil film between the oil control ring and the cylinder wall during operation.

Oil control ring design maintains a compromise between reducing oil consumption and maintaining sufficient lubrication over the life of the engine. Excessive wear on the oil control ring outer radial surface may widen the gap between the oil control ring and the cylinder wall. This excessive wear can have a negative impact on the oil consumption of the engine. It is therefore desirable to minimize the amount of wear the oil control ring experiences during its operational lifespan.

When operating at high speed, rings can experience either excessive blowby or excessive oil consumption, depending on the load. Blowby can occur due to distortion of the ring, in which combustion gases blow past the ring. Excessive oil consumption can occur if insufficient scraping occurs during the downstroke, leaving oil on the combustion side of the piston. To improve oil control ring operation, some known designs include a positively twisted ring.

A twisted ring can be beneficial to reduce blowby and oil consumption. That is, during the downstroke operation the ring may dynamically twist, which can cause an increased angular orientation of the ring against the wall. In such fashion the scraping is improved because the distortion of the ring can force the ring outward and against the cylinder wall, improving the scraping effect. The opposite occurs on the sliding upstroke, where the amount of distortion in the ring reduces, which can slightly pull the ring inward and reduce its propensity to scrape oil. As such, both oil consumption and blowby are improved in a twisted ring design.

One known twisted ring design includes a chamfer or step that is formed in the inner/uppermost corner of the ring that is diagonal from the corner that scrapes during the scraping motion. As a conventional ring distorts during operation (and particularly during the downstroke), the mass of the ring diagonal to the scraping corner causes increased and possibly nonuniform distortion in the ring. As such, by removing material in the inner and uppermost corner of the ring in a twisted ring design, the propensity to nonuniformly distort may be reduced or removed, and a generally uniformly variable twist occurs in the ring about its circumference during the downstroke. The circumferential twisting effect, however, can cause a twist that is typically a minimum near the break in the ring and a maximum at approximately 180° from the break. Accordingly, such designs typically include tradeoffs where, in a design to obtain sufficient scrape near the break in the ring, excess scraping (and therefore excess wear) may occur at the maximum twist location. However, in a design meant to reduce the excess scraping at the maximum location, insufficient contact may occur near the break during the upstroke, which can lead to blowby in that portion of the ring.

As such, there is a need to improve piston ring designs. In addition, there are always the competing goals of maximizing performance while minimizing cost and weight. In designing a piston, would be desirable to minimize the size of the piston head by reducing the number of piston rings and ring grooves, while still maximizing sealing in the chamber, lubrication and oil scraping properties. Some concerns with using only a two ring design are higher oil consumption, unstable blow-by sealing and a high level of carbon deposits. When the scraping and sealing capability of a second ring is no longer there, more oil can easily migrate upwards, increasing lubrication oil consumption (LOC). It is difficult to keep a proper pressure balance with a two-ring system, even including a deep groove on the piston second land. There would likely be a rapid pressure increase on piston land, creating a top ring instability, and then reverse flow carrying oil is expected, increasing LOC. In addition, carbon deposit formation is accelerated within the ring belt area.

SUMMARY OF THE INVENTION

It is therefore an object of the present invention to provide a piston that reduces the number of piston rings, yet has sufficient sealing and lubrication properties and minimizes blow-by and oil consumption.

This object is accomplished by a piston assembly that has only two rings, which include a scraper ring and an oil control ring. The combustion ring, which is usually present in a three-ring system, is eliminated. The scraper ring provides a scraping motion during a downward motion of the piston assembly, and a sliding motion during an upward motion of the piston assembly. The oil control ring controls the supply of oil to a liner, which lubricates the piston skirt and the other rings. The oil control ring is preferably of a U-flex type.

The oil scraper ring used in the piston of the present invention is described in US Patent Application Publication No. 2017/0284331, the disclosure of which is herein incorporated by reference, and has a specific structure and function that overcomes the drawbacks associated with scraper ring distortion. Due to the unique design of the cross-section of the scraper ring according to the invention, the ring flexes when installed and dynamically flexes during operation to improve oil scraping against a cylinder bore. That is, a force is generated against the ring that is constant about its circumference—when first installed and then during a reciprocal and dynamic operation. The behavior of the ring is akin to the operation of a spring that flexes during operation. Flexing in one direction causes an improved scraping motion, and flexing (or relaxing) in the other direction causes an improved sliding motion over the film of oil within the cylinder.

The constant circumferential force causes the ring to flex with a constant twist about an axis of rotation defined at each cross-sectional location of the ring about its entire circumference between adjacent free ends, resulting in a constant scraping effect. Having a constant scraping effect about the circumference of the ring allows for an improved scraper ring design and operation. As mentioned above, in a scraper ring design when non-uniform twist occurs, the ring is designed typically for extremes of operation about its circumference, which can result in possibly excess scraping in some portions of the ring, and possible blowby in other portions of the ring. The disclosed design avoids these pitfalls by providing a design in which sliding is achieved about the entire ring, due to the ring assuming, in its flexed state, a constant radial twist that occurs over its circumference and between the ends of the ring, resulting in enhanced ring life and improved engine performance.

The scraper ring has a generally rectangular cross-section with an asymmetric profile, having the scraping corner being tapered or with a radius. Preferably, the scraper ring is formed of carbon steel with a chrome inlay on the face side for added durability.

The oil control ring can be either a beveled ring with or without a coil spring, or can be a U-flex design also with or without a coil spring or a 3-piece side-sealing oil control ring. The scraper ring above, combined with either a two-piece beveled or U-flex ring, can achieve optimum performance with lower weight, thus obviating the need for a third ring.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1:
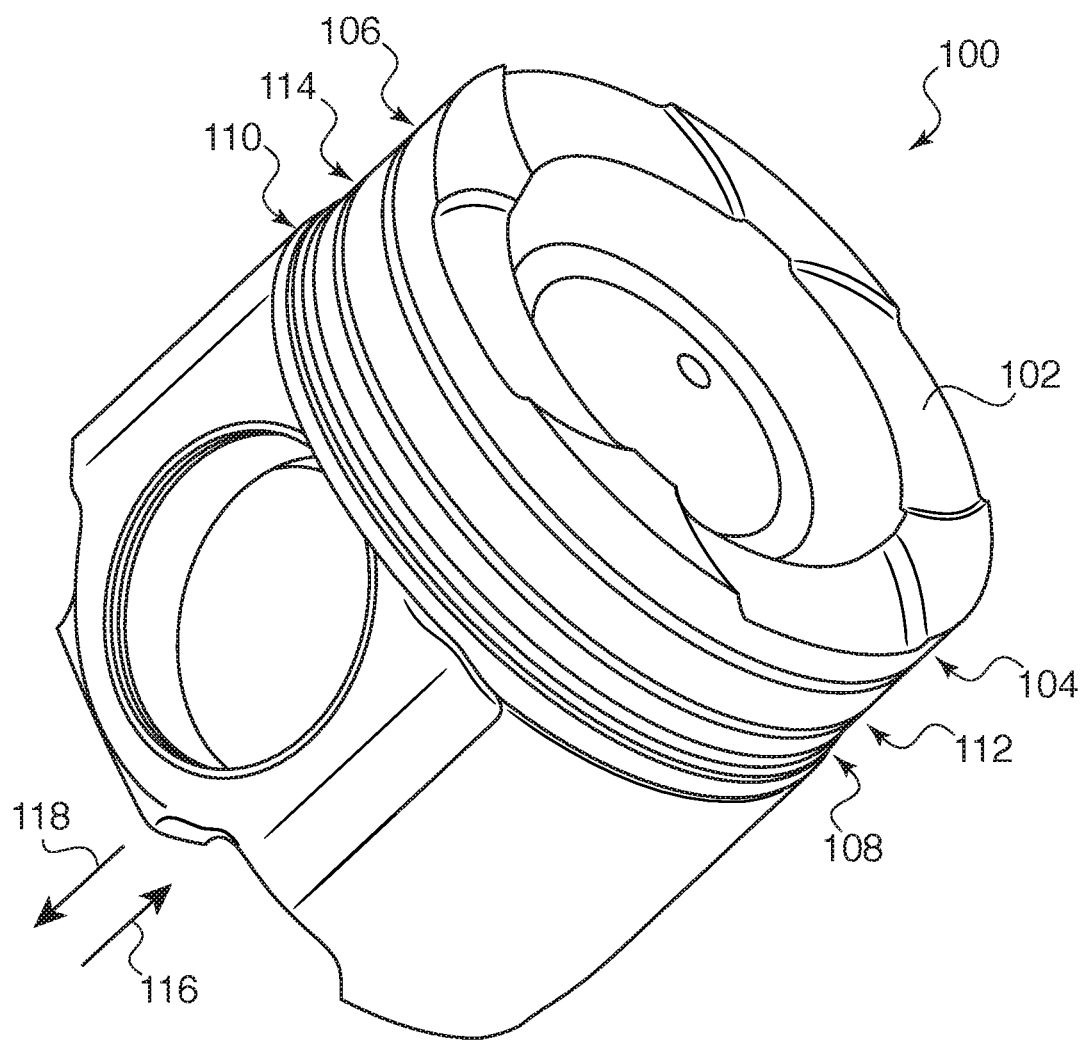
FIG. 1 is a view of a piston assembly of the prior art.

Referring to FIG. 1 a piston assembly 100 according to the prior art is illustrated. Piston assembly 100 includes a piston head 102 including an upper compression ring 104 positioned within an upper compression ring groove 106, and an oil control ring 108 positioned within a lower compression ring groove 110. The piston head 102 further includes a scraping or scraper ring 112 positioned within a middle groove 114. That is, the scraper ring 112 is placed within the middle groove 114. The rings 104, 108, and 112 seal against cylinder bore surfaces during reciprocal motion of the piston assembly 100 within a cylinder bore. The piston head 102 moves in a first or upward direction 116 during the upstroke phase of the piston assembly 100 and a second or downward direction 118 during the downstroke phase of the piston assembly 100.

Figure 2A:
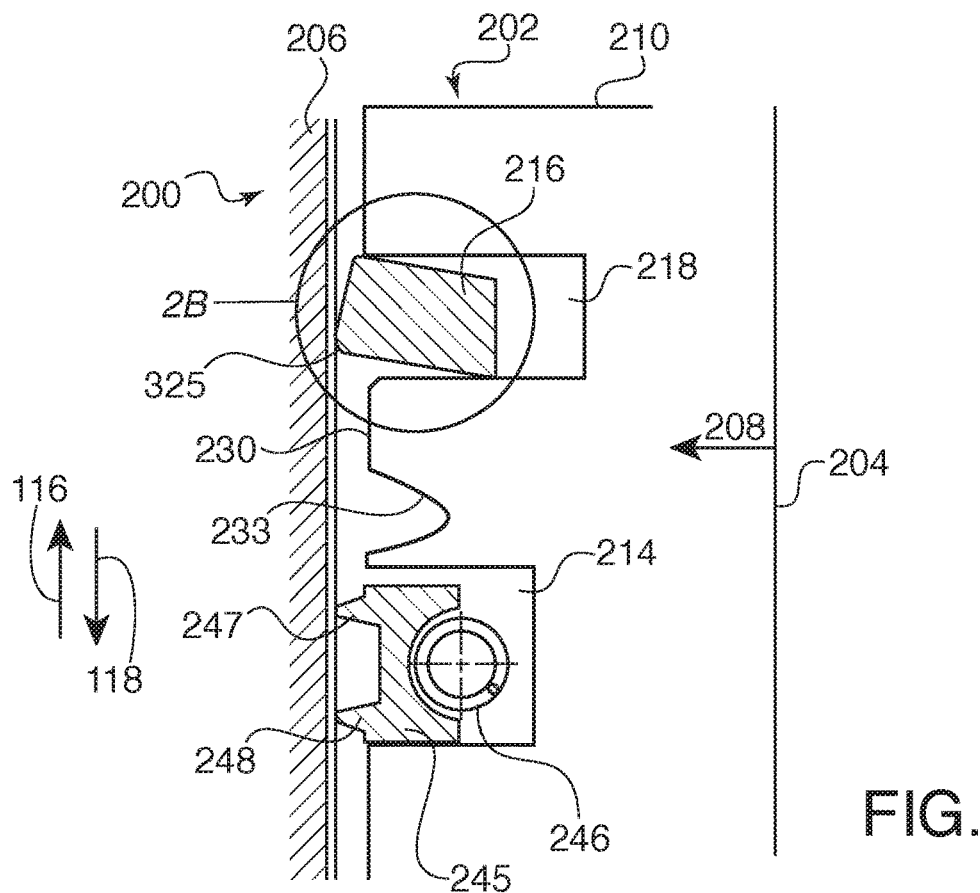
FIG. 2A is a cross-sectional view of the piston rings and ring grooves of a piston according to the invention.

Referring now to FIG. 2A, a piston assembly 200 according to the invention for an internal combustion engine includes a cylinder bore 202 having a central axis 204 and a cylinder wall 206 that is equidistant from the central axis 204. The piston assembly 200 includes a radial axis 208 that is orthogonal to central axis 204. The piston assembly 200 includes a piston 210 having two ring grooves, including an oil control ring 245 and groove 214, and a scraper ring 216 positioned within a scraper ring groove 218. The piston according to the present invention does away with the need for a third ring, and thus the combustion ring and groove 106 of the prior art piston shown in FIG. 1 can be eliminated.

In this embodiment, the piston second land 230 has a cutout 233 that acts as a reservoir and to provide a space to contain a volume of oil and gas to reduce the pressure between the first and second ring. Cutout 233 may be of varying geometries and optimized to retain the gas and oil under various operational conditions such as fuel, displacement and piston dynamics during the combustion cycle.

Figure 2B:
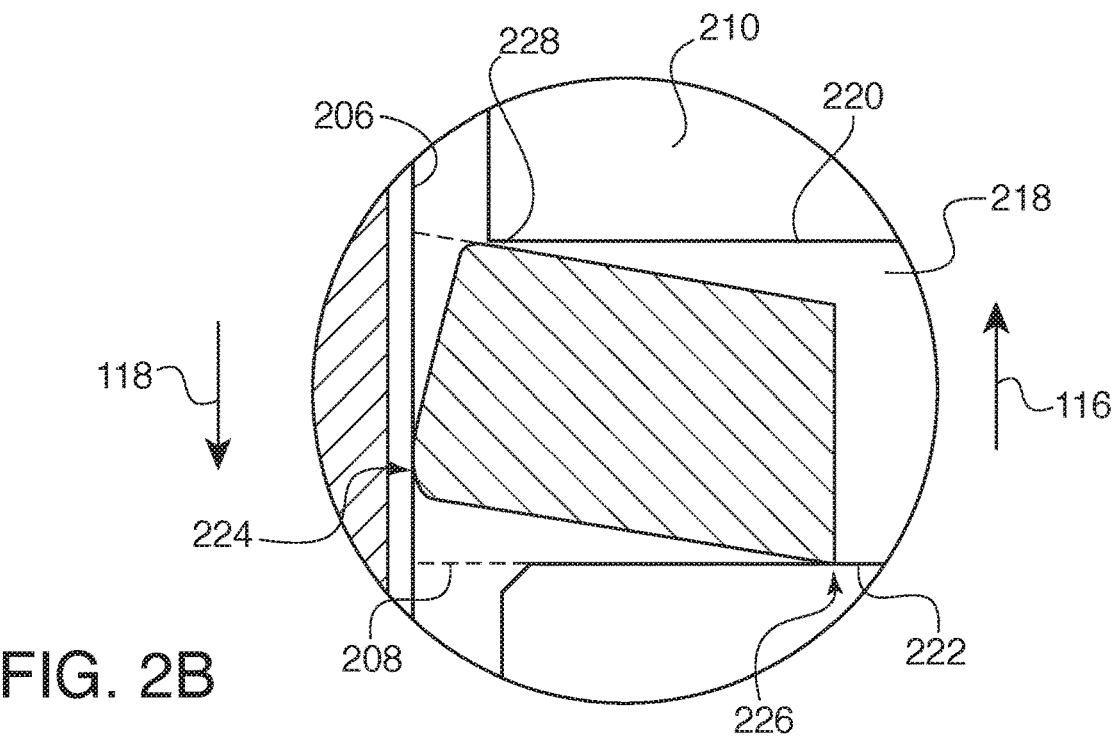
FIG. 2B is a cross-sectional view of an oil scraper ring for use in the present invention.

Details of a cross section of scraper ring 216 are shown in FIG. 2B. Referring to FIG. 2B, groove 218 is formed between an upper groove surface 220 and a lower groove surface 222. Scraper ring 216 is positioned within groove 218 such that the scraper ring is constrained against upper groove surface 220 when piston 210 moves in downward direction 118, and scraper ring 216 is constrained against lower groove surface 222 when piston 210 moves in upward direction 116. Scraper ring 216 is positioned within groove 218, above groove 214. The ring 245 in groove 214 typically serves primarily as an oil control ring that controls the distribution of oil for lubrication purposes. The orientation of scraper ring 216 is referred to as a positive twist scraper ring. As can be seen below in FIGS. 10 and 11, a negative twist scraper ring could also be used.

As will be further described, scraper ring 216 includes a cross-sectional profile that significantly reduces or eliminates the amount of non-uniform twist that occurs about a circumference of scraper ring 216, when statically installed, and also during motion of piston 210 in both upward direction 116 and downward direction 118. When piston 210 moves in the upward direction 116 prior to combustion, scraper ring 216 slides against cylinder wall 206 and, owing to its shape, a film of oil (not shown) on cylinder wall 206 is slid or glided over, and not scraped, such that the film of oil is not pulled by scraper 216 when piston 210 moves in upward direction 116. When traveling in the downward direction 118, scraper ring 216 scrapes against cylinder wall 206, causing oil to be scraped downward and in motion with piston 210.

Figure 3A:
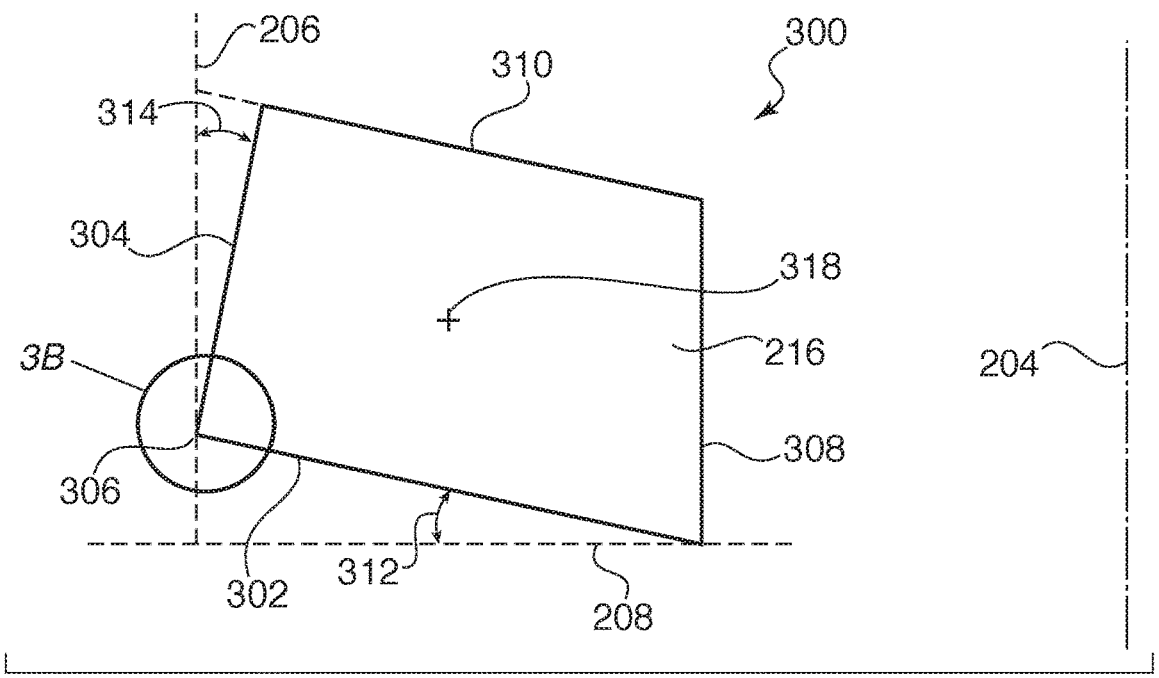
FIG. 3A is a detailed discussion of aspects of the cross-sectional view of the oil scraper ring.
Figure 3B:
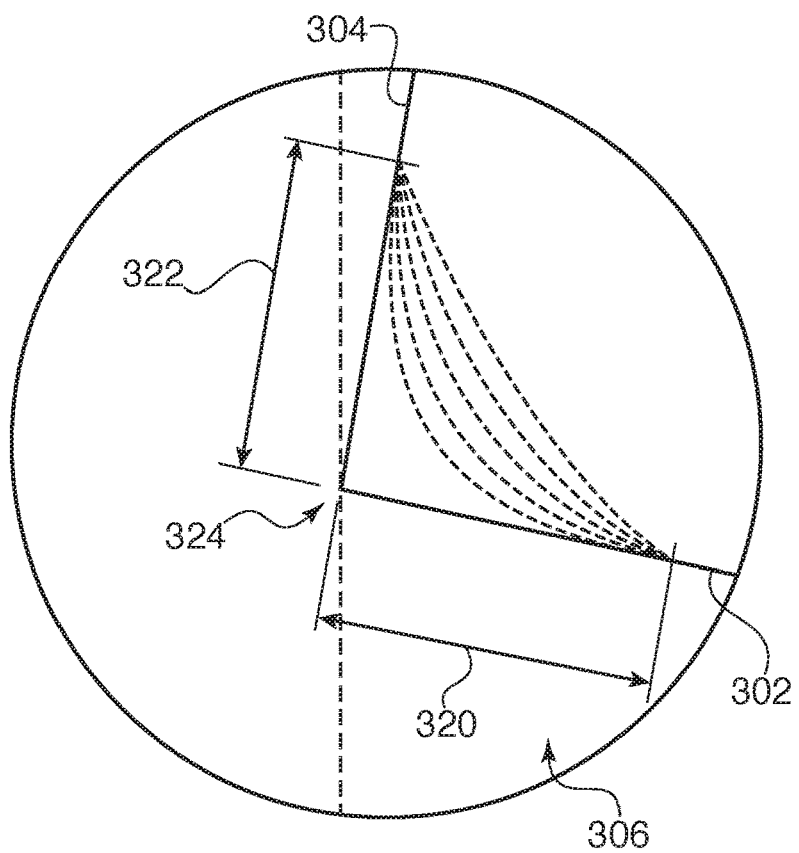
FIG. 3B is an enlarged view of the scraping corner of the oil scraper ring of FIG. 3A.

Referring now to FIG. 3A, a cross-section 300 of scraper ring 216 is shown. FIG. 3 shows scraper ring 216 in its unflexed or relaxed static state. FIG. 2B also shows scraper ring 216 in its relaxed shape when unflexed. However, as will be further described, scraper ring 216 absorbs energy by flexing against its tendency to return to its static state during certain portions of a piston cycle operation. More specifically, it is subjected to various forces applied thereto as a result of its contact with cylinder wall 206, and corresponding engagement surfaces within groove 218.

Figure 4:
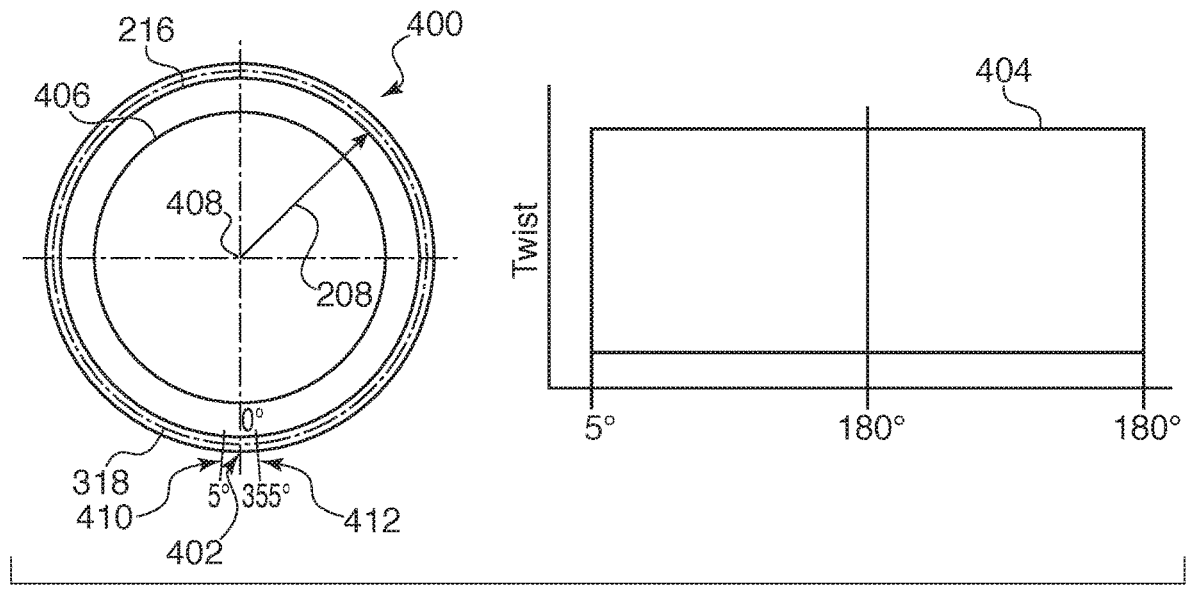
FIG. 4 is a plan view of the oil scraper ring of FIG. 3 and a corresponding illustration of uniform twist about its circumference in a static form when the ring is installed to piston bore.

In one form, cross-section 300 includes a lower surface 302 and an outer radial surface 304 that form a scraping corner 306. Cross-section 300 includes an inner radial surface 308 and an upper surface 310. In the example illustrated, the upper surface 310 and the lower surface 302 are generally parallel with one another. That is, within the commercially acceptable tolerances achievable with mass production machining practices, upper surface 310 and lower surface 302 are parallel. Having upper and lower surfaces 310, 302 parallel with one another is one aspect of the design that allows for the constant twist of scraper ring 216 to occur about its circumference during operation. That is, scraper ring 216 has the same thickness as one moves along its radial direction from an inner periphery of the ring to an outer periphery of the ring, making scraper ring 216 less "flimsy" than if the thickness is varied. Thus, the propensity of the ring to distort about its circumference 406 when first installed and as it is flexed about an axis or rotational center 318, as shown in FIGS. 3A and 4, and discussed in more detail below, has been found to be minimized.

Also, both upper and lower surfaces 310, 302 form a positive first angle 312 with respect to radial axis 208. More specifically, first angle 312 is defined as positive, in that lower surface 302 and upper surface 310 each extend upward from the position of radial axis 208 and extend away from inner radial surface 308. The outer radial surface 304 forms a second angle 314 with respect to the central axis 204. As seen therein, second angle 314 is defined with respect to cylinder wall 206, scraper ring 216 contacts the cylinder wall 206 at the location of the scraping corner 306, and second angle 314 is defined as extending upwardly and inwardly from there. Second, angle 314 is shown as having a positive angle as extending upward and inward from its constant point with cylinder wall 206.

In addition, the scraping corner 306 may define a sharp corner as illustrated in FIG. 3A. However, in other forms the scraping corner 306 may define an edge radius or chamber with various reliefs shapes varied from 0.2 mm or less from the sharp corner, as illustrated in the enlarged view of FIG. 3B. The edge profile can have differing geometries from a constant radius, to various contours starting from 0.2 mm from the sharp corner. That is, scraping corner 306 in various examples includes a relief in which a first distance 320 and a second distance 322 may define an approximate region for the relief based on a manufacturing ability to machine a sharp corner. First and second distances 320, 322 may be approximately 0.2 mm as examples but may deviate slightly from an ideal or hypothetical sharp corner based on machining and manufacturing capabilities. That is, the hypothetical sharp corner 324 may be a point or edge that is formed at an intersection or hypothetical point of outer radial surface 304 and lower surface 302. Alternatively, the corner may have a larger radius or cut, as shown by radius 325 in FIG. 2A.

Referring still to FIG. 3A, the first and second angles 312, 314 have different angular values from one another in the illustrated approach, but in another illustrative approach angles may have the same value. In one illustrative example, the first angle 312 is less than 5° and may be approximately 0.5°, ±0.2°. In another illustrative example, the first angle may be in a range between 0.1° and 8°, and in some forms the first angle may be different for each of the upper and lower surfaces resulting in a non-parallel relationship between the upper and lower surfaces within the first angle range. Additionally, in another example the second angle 314 is less than 4°, and the second angle 314 may be preferably approximately 1°±0.2°. That is, by stating the angles are approximate angles, it is contemplated that the angles may be within approximately ±0.2° of the nominal value. As such, it has been determined that the disclosed nominal angular values for first angle 312 and second angle 314 result in a constant flexing of scraper ring 216 about axis 318 shown in FIGS. 3A and 4 at any point along its circumference between adjacent opposing free ends 410, 412 of the ring (i.e., not including break or gap 402), with the approximate angles being established as within normal machining operations. More specifically, axis 318 represents an axis about which cross-section 300 rotates during the reciprocation of the piston 210. Thus, so long as positive scraping forces are maintained during the scraping operation, and sufficient relaxation of the ring occurs during the sliding motion, the positive angular values may be selected within the disclosed bounds.

Referring back to FIG. 2B, when first statically installed and during operation (whether the upstroke or the downstroke), scraper ring 216 engages against cylinder wall 206 at a line of engagement shown by a point 224 in two dimensions. In the downstroke of piston 210, scraper ring 216 is bound within groove 218, contacting and forcing scraper ring 216 to engage at groove contact points 226 and 228. Being pressed upward against groove 218, scraper ring 216 is thereby constrained and, owing to the generally parallel walls or surfaces 302, 310, as well as the optimally selected first angle 312, the scraper ring 216 twists about its cross-section and uniformly about the circumference of the ring, creating a consistent line of engagement between the edge of the scraper ring and corresponding wall surface of cylinder wall 206 about the entire circumference of the ring. The scraper ring 216 may also commonly be known as a compression ring or simply the first ring.

In the upstroke of piston 210, the forces at engagement points 226, 228 relax, and scraper ring 216 is pulled upward but glides in a much gentler fashion over cylinder wall 206, when compared to the forces generated during the scraping motion. As such, second angle 314 between outer radial surface 304 and cylinder wall 206 remains positive, having a nominal angle of 1°. In such fashion, during the upstroke of piston 210, second angle 314 will always remain positive, avoiding any propensity to cause a scraping action. First angle 312 is selected based on the ability of scraper ring 216 to become bound within groove 218 during the scraping motion. Second angle 314 is selected independently from the selection of first angle 312, and is selected based on the ability of scraper ring 216 to slide during the sliding operation.

Referring now to FIG. 4, a plan view 400 of scraper ring 216 is shown, having a break 402 at a reference position defined as 0° and increasing clockwise. Owing to the cross-sectional features of scraper ring 216 as discussed previously, a uniform amount of twist is induced within scraper ring 216 when installed on to the piston or closed down to the bore diameter of the cylinder. The scraper ring 216, during the scraping motion, maintains a more uniform amount of twist, but due to the reciprocating and variation in the cylinder may impart a degree of variation. Thus, the uniform disposition of the scraper ring 216 is maintained about the circumference of the ring.

That is, when piston 210 moves in the downward direction 118, then the scraping corner 306 contacts cylinder wall 206 in a fashion in which twist of scraper ring 216 is constant and uniform 404 about a circumference 406 of scraper ring 216, adjacent up to but not including the free ends 410, 412 that are in a region defined as approximately 5° in either direction of circumference 406 and spaced away from the break 402. Break 402 in scraper ring 216 occurs to enable attachment of scraper ring 216 within its groove 218, while allowing some play in the ring to permit scraper ring 216 to twist as described. However, due to modest end effects in the end parts of the ring where they meet (approximately ±5° of its circumference), it is contemplated that some non-uniform distortion of the ring may occur. Thus, a constant twist occurs over the majority of the circumference of scraper ring 216, significantly improving scraping and sliding of the disclosed ring 216, and its unique design characteristics as described, compared to previous designs. Aside from the locations where end effects may occur, no matter what cross-sectional location about the circumference of the ring, a constant force is applied to the scraping ring in both up and down stroke directions, resulting in a constant twist about its cross section due also to the disclosed design that flexes uniformly as a result of the applied force.

Figure 5:
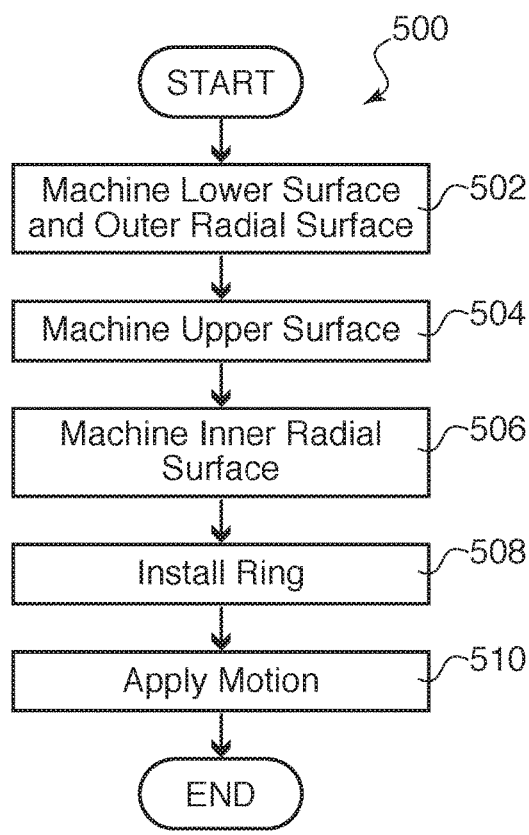
FIG. 5 is a method of fabricating an oil scraper ring as disclosed herein.

FIG. 5 illustrates a method 500 of fabricating scraper ring 216 that includes machining the various details of scraper ring 216, as described above. It is contemplated that scraper rings are commonly fabricated in a stamping process for bore diameters that are less than 110 mm. However, for larger bore engine designs, such as having a bore diameter greater than 110 mm, the disclosed examples are instead machined. Method 500 includes a step 502 of machining a lower surface and an outer radial surface of the ring to form a scraping corner, and step 504 includes machining an upper surface to be approximately parallel with the lower surface in a cross section of scraper ring 216. Step 506 includes machining an inner surface of the ring. Referring to FIGS. 3A-4, upper surface 310 and lower surface 302 are machined to form first angle 312 with respect to radial axis 208 of scraper ring 216. The radial axis 208 extends radially from a centroid 408 of scraper ring 216. Central axis 204 of piston 210 corresponds with and generally passes through centroid 408, and central axis 204 is orthogonal to radial axis 208. Outer radial surface 304 is machined to form second angle 314 with respect to central axis 204. In one example, the lower surface 302 and the outer radial surface 304 are machined such that the first and second angles 312, 314 are different from one another. The first angle 312 is machined to be less than 1°, and is approximately 0.5°. in one example. The second angle is machined to be less than 2°, and is approximately 1°, as described above. Accordingly, with properly machined angles, tolerances, and faces with respect to one another, the benefits of scraper ring 216 and its operation described above accrue to a ring machined as described.

Thus, at step 508 scraper ring 216 is installed within groove 218 of piston 210 and is in a static state before any reciprocating operation of the piston. That is, the static state refers to its state when contained within groove 218 but before a reciprocating operation. Piston 210 may be operated in a reciprocating fashion, which is in both upward direction 116 and downward direction 118. At step 510 the reciprocating motion is applied, causing the ring to move from its static state to a dynamic flexed state. The flexed states are typically different in each direction because the direction of forces differ as well.

For instance, when piston 210 moves in an axial and upward direction 116, then force is imparted at scraping corner 306 and in downward direction 118 that is opposite a direction of axial motion. The motion of step 510 causes the scraper ring 216 to twist from its free state to its flexed state and against groove 218 of the piston assembly 200, wherein an amount of twist in the flexed state occurs the same amount at each cross-sectional location of the ring about its circumference and between adjacent free ends thereof. When the axial motion is in upward direction 116 within the piston assembly 200, the force imparted is in the downward direction 118, causing the positive second angle 314 to decrease in magnitude in this flexed state. When motion of step 510 is instead in the downward axial direction within the piston assembly 200, the force imparted at scraping corner 306 is in the upward direction 116 causing the positive first angle 312 to increase in magnitude at this flexed state.

As such, in operation, piston 210 is operated by reciprocating within its cylinder. When piston 210 reciprocates in the downward direction 118, forces are generated against scraper ring 216 from cylinder wall 206, causing the scraper ring 216 to become tightly bound within groove 218. Scraper ring 216 is machined such that angle 312 is positive not only in its unflexed state, but also in its flexed state. That is, the forces imparted at point 224 against scraper ring 216 occur about the circumference of the ring and cause scraper ring 216 to react in a constant fashion about its circumference. The amount of flexing that occurs in scraper ring 216 about axis 318 is therefore constant, due not only to the uniform forces applied about the circumference, but also due to the design of the cross-section of scraper ring 216 as well.

When piston 210 reciprocates in the upward direction 116 and piston 210 slides over an oil film on cylinder wall 206, forces likewise develop in a constant fashion about the circumference of the scraper ring 216. Second angle 314 is selected within the bounds described such that, even with full relaxation of scraper ring 216 and even with any additional resulting forces pushed against scraper ring 216 during upward motion 116, a positive angle 314 is nevertheless maintained despite flexing to the flex state so that a sliding motion occurs. In other words, such an angle ensures that regardless of forces that occur during the upward motion 116 of piston 210, clearance is nevertheless maintained.

As such, twist in large diameter rings can be induced by machining the scraper rings instead of stamping them. Benefits include a constant twist which will lift the bottom edge of the scraper ring from the running surface when the piston is moving in the upward direction, and scraping is improved when the piston is moving in the downward direction. In some application, the rings may have a diameter that may exceed 90 mm.

Scraper ring 218 is preferably formed of carbon steel with a chrome inlay 260 on its face surface. This inlay can be formed by plating or by any other preferred method.

Referring back to FIG. 2A, oil control ring 245 is a two-piece ring, having two protrusions 247, 248 that project outward of groove 214 and are configured for contacting cylinder wall 206 during piston operation. A spring 246 is mounted between ring 245 and the rear wall of groove 214 to maintain ring 245 in proper position in groove 214. The combination of the scraper ring 216 with the oil control ring 245 leads to increased sealing, improved oil drainage, an optimal pressure between the piston lands, and less blow-by due to a decreased top ring gap.

Figure 6:
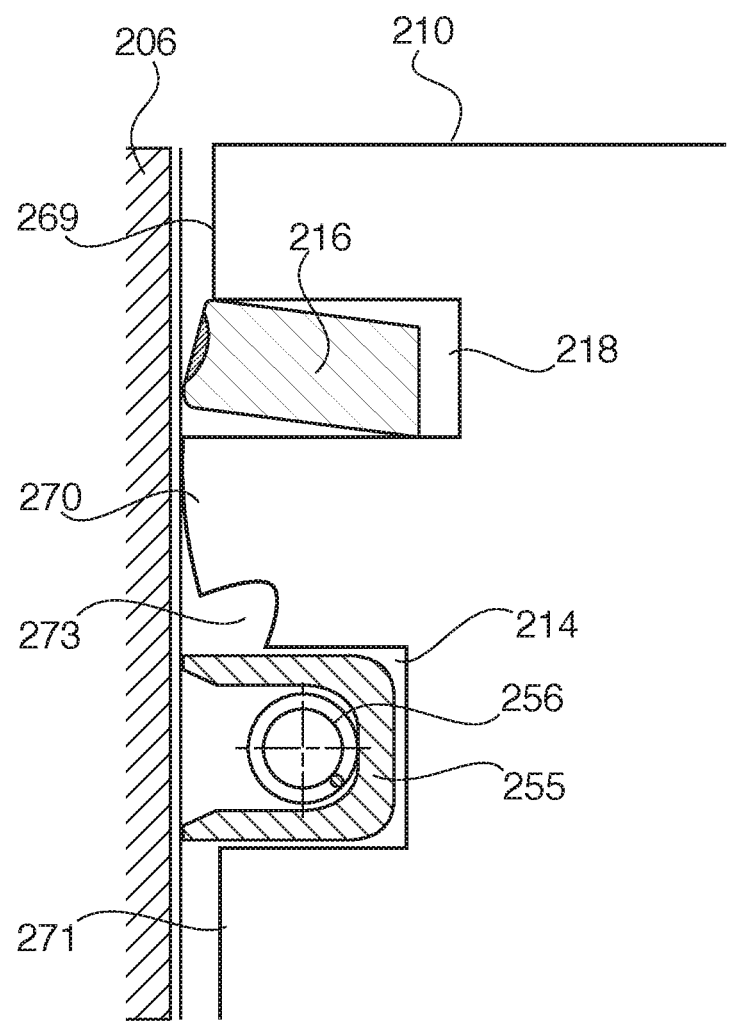
FIG. 6 is a cross-sectional view of the piston rings and ring grooves of another embodiment of the present invention.
Figure 7:
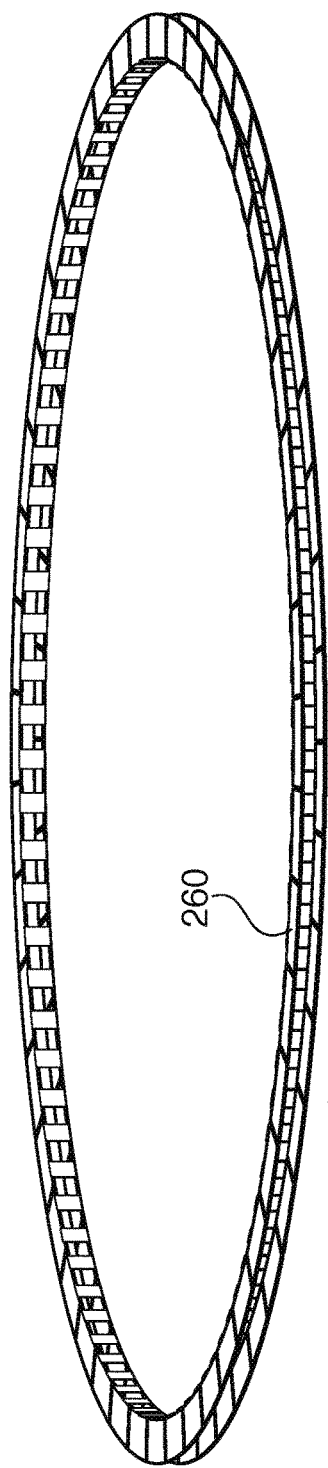
FIG. 7 is an enlarged view of the oil control ring for use with the embodiment of FIG. 6.
Figure 8:
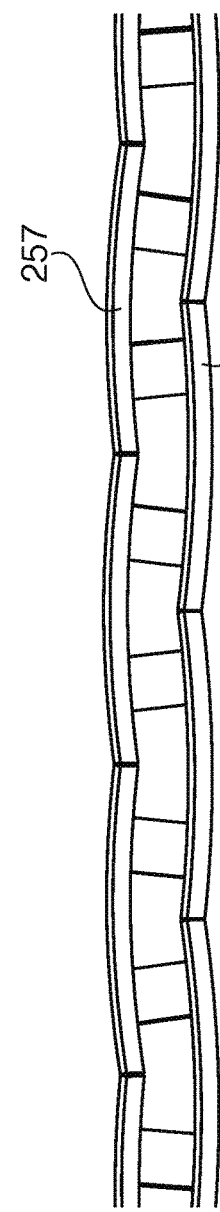
FIG. 8 is another view of the oil control ring of FIG. 7.
Figure 9:
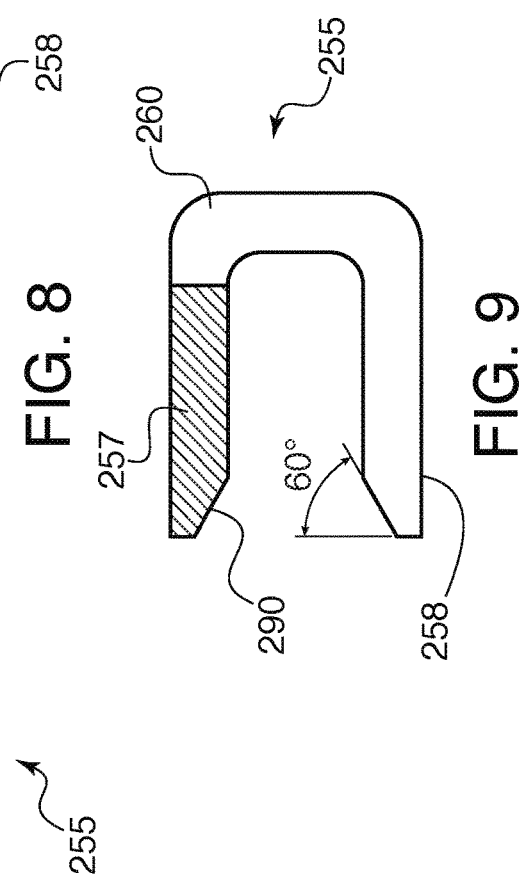
FIG. 9 is a cross-sectional view of the oil control ring of FIGS. 7 and 8.

FIG. 6 shows another embodiment of the piston according to the invention. This embodiment is similar to FIG. 2A, but utilizes a U-flex oil control ring 255 instead of ring 245. A plan view of U-flex ring 255 is shown in FIG. 7 and the ring in use is shown in FIG. 8. A cross-section of ring 255 is shown in FIG. 9. Each of segments 260 forms two projecting legs 257, 258, which contact cylinder wall 206 during engine operation. In use, the connections between segments 260 of ring 255 flex and allow relative movement of the sections in response to the up and down motion of the piston, and provide improved sealing and oil control properties.

In the present invention a spring 256 is added inside the U, to keep the ring in place during use. As can be seen in the cross-section in FIG. 9, the U-ring has a top extension 257 and a bottom extension 258. Each of these extensions has a chamfer 290 cut on its ends, so that a smaller thickness of the ring contacts the cylinder wall 206. This chamfer may be cut at an angle of 60° to the vertical, but other angles could also be used. In particular, the angle may be varied to adjust the running surface face or contact surface 291.

As shown in FIG. 6, the gap between the second land 270 and the cylinder wall 206 is minimized by extending the second land beyond the radius of the first and third lands 269, 271. The second land is formed by a portion 271 that runs parallel to the cylinder wall 206, followed by a sloped portion 272 that slants away from cylinder wall 206. A cutout 273 is formed in a lower corner to form a reservoir for oil and gas and to reduce the pressure between the piston rings.

Figure 10:
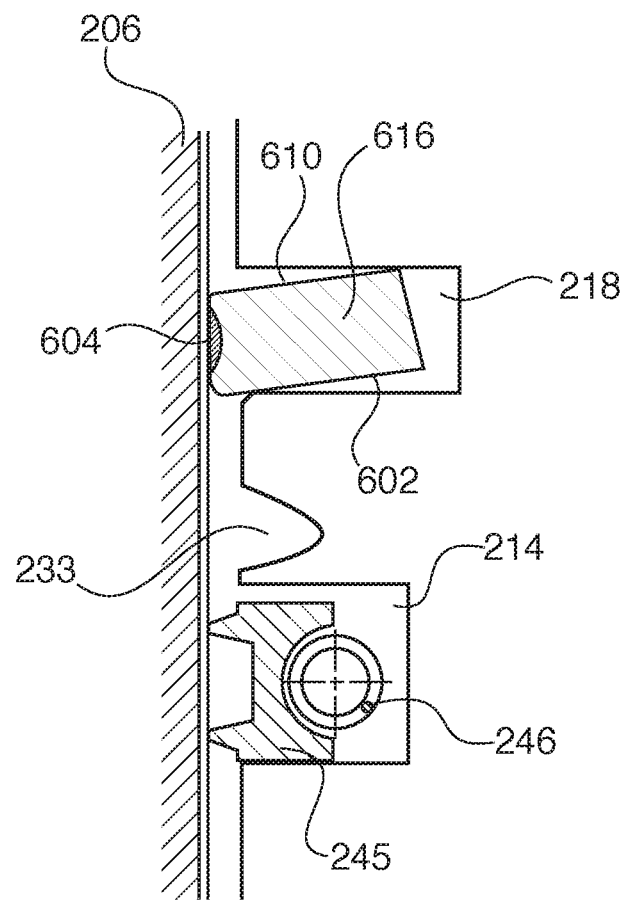
FIG. 10 is a cross-sectional view of an alternative embodiment of the invention.
Figure 11:
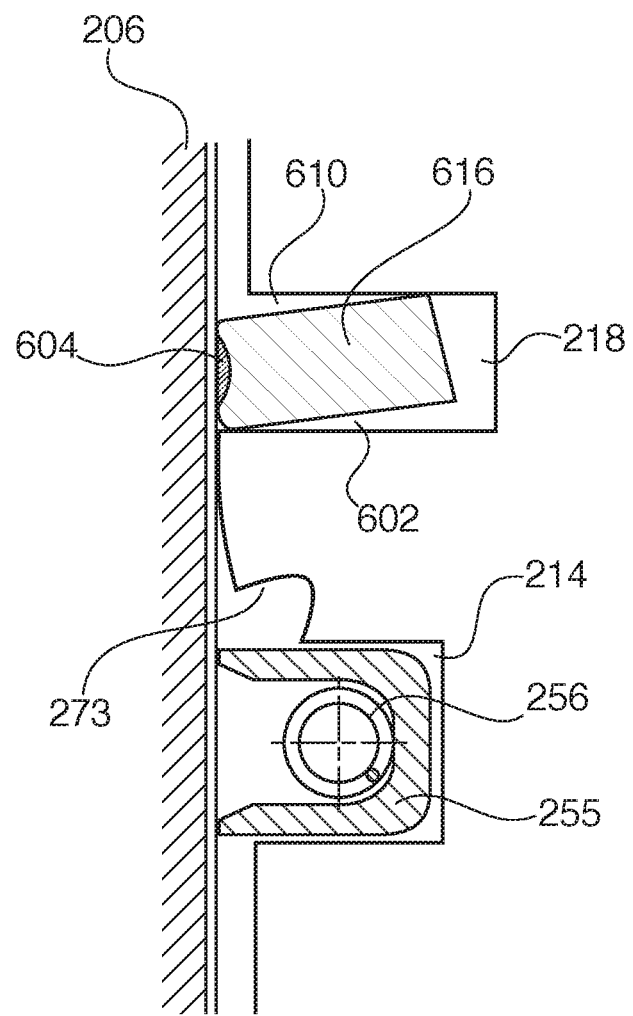
FIG. 11 is a cross-sectional view of another alternative embodiment of the invention.
Figure 12:
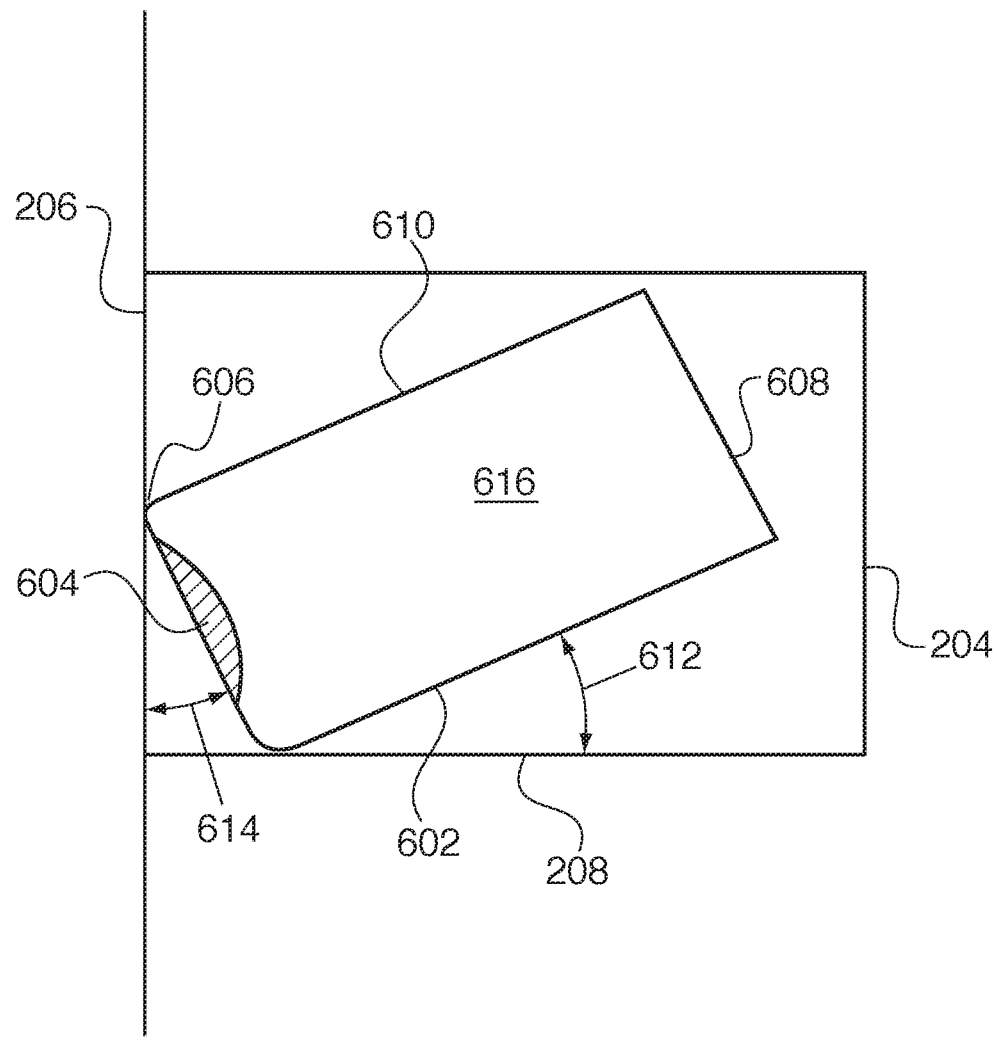
FIG. 12 is an enlarged view of the scraper ring shown in FIGS. 10 and 11.

Alternative embodiments of the invention are shown in FIGS. 10 and 11, with an enlargement of the scraper ring in FIG. 12. In these embodiments, the scraper ring 616 is formulated with a negative twist, as opposed to the positive twist scraper ring 216 of FIGS. 2A and 6. Here, both upper and lower surfaces 610, 602 of scraper ring 616 form a negative first angle 612 with respect to radial axis 208. More specifically, first angle 612 is defined as negative, in that lower surface 602 and upper surface 610 each extend downward from the position of radial axis 208 and extend away from inner radial surface 608. The outer radial surface 604 forms a second angle 614 with respect to the central axis 204. As seen therein, second angle 614 is defined with respect to cylinder wall 206, scraper ring 616 contacts the cylinder wall 206 at the location of the scraping corner 606, and second angle 614 is defined as extending downwardly and inwardly from there. Second, angle 614 is shown as having a negative angle as extending downward and inward from its contact point with cylinder wall 206. Upper surface 610 and lower surface 602 extend downwardly as these surfaces extend from the inner radial surface 608 toward the outer radial surface 604.

As shown in FIG. 10, the oil control ring 245 is used, while in FIG. 11, oil control ring 255 is used. These rings are described above with respect to FIGS. 2A and 6.

In the present invention, the twist may vary according to the engine dynamics. Such designs with a negative twist may be optimized for certain applications, and additional positive twist may provide dynamic improvements. The twist direction in the relaxed state of the ring may vary to provide a more stable blow-by around ring during the dynamic operation of the engine, to further improve the OD sealing. In some applications, positive twist may reduce or mitigate a microwelding condition.

Accordingly, it is to be understood that the above description is intended to be illustrative and not restrictive. Many applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston assembly for an internal combustion engine, comprising:
    a cylinder bore having a central axis and a cylinder wall that is equidistant from the central axis, and forming a radial axis that is orthogonal to the central axis;
    a piston having exactly two ring grooves and piston lands adjacent the ring grooves, with one of the piston lands being disposed between the two ring grooves, and one piston land disposed above an upper one of the ring grooves and one piston land disposed below a lower one of the ring grooves;
    a scraper ring positioned within an upper one of the ring grooves, the scraper ring having a cross-section comprising:
        a lower surface and an outer radial surface that form a scraping corner;
        an inner radial surface; and
        an upper surface;
    wherein:
        the upper surface and the lower surface are generally parallel with one another, and both upper and lower surfaces form a positive or negative first angle with respect to the radial axis; and
        the outer radial surface forms a positive or negative second angle with respect to the central axis;
    such that when the ring is installed on the piston within the cylinder bore, a constant twist occurs in the ring about a rotational center of the cross-section, the constant twist occurring at each cross-sectional location of the ring about the circumference of the ring and between adjacent free ends of the ring; and an oil control ring positioned in a lower one of the ring grooves, the oil control ring having a face side that forms two points of contact with the cylinder wall, wherein the piston land that is positioned between the two ring grooves has a larger radius than a radius of the piston lands that are positioned above the upper ring groove and below the lower ring groove.

2. The piston assembly of claim 1, wherein oil control ring further comprises a coil spring extending circumferentially around that ring groove and being positioned in a circumferential groove of the oil control ring.

3. The piston assembly of claim 1, wherein the oil control ring has a U-shaped cross section and is formed of a plurality of joined segments that are configured to move relative to one another during piston operation.

4. The piston assembly of claim 3, wherein the U-shaped cross-section of the oil control ring has a top extension and a bottom extension that extend outwardly toward the cylinder wall, and wherein free ends of the top and bottom extensions are chamfered so that the free ends have a smaller thickness than the rest of the top and bottom extensions.

5. The piston assembly according to claim 1, wherein a piston land positioned between the two ring grooves has a circumferential cutout.

6. The piston assembly according to claim 1, wherein the piston land positioned between the two ring grooves has a circumferential cutout along a lower edge thereof.

7. The piston assembly according to claim 1, wherein the scraper ring has a generally rectangular cross-section.

8. The piston assembly according to claim 1, wherein the scraper ring is formed of carbon steel with a chrome inlay on a face surface thereof.

9. The piston assembly of claim 1, wherein the scraping corner of the scraper ring includes a relief having a contour in the form of a radius or chamfer at an intersection of the lower surface and the outer radial surface.

10. The piston assembly according to claim 1, wherein the first and second angles are both positive, such that the upper and lower surfaces extend upward with respect to the radial axis, extending away from the inner radial surface of the scraper ring.

11. A piston assembly for an internal combustion engine, comprising:
- a cylinder bore having a central axis and a cylinder wall that is equidistant from the central axis, and forming a radial axis that is orthogonal to the central axis;
- a piston having exactly two ring grooves and piston lands adjacent the ring grooves;
- a scraper ring positioned within an upper one of the ring grooves, the scraper ring having a cross-section comprising:
  - a lower surface and an outer radial surface that form a scraping corner;
  - an inner radial surface; and
  - an upper surface;
  - wherein:
    - the upper surface and the lower surface are generally parallel with one another, and both upper and lower surfaces form a negative first angle with respect to the radial axis; and
    - the outer radial surface forms negative second angle with respect to the central axis, such that the upper and lower surfaces extend downward with respect to the radial axis, extending away from the inner radial surface of the scraper ring, and such that when the ring is installed on the piston within the cylinder bore, a constant twist occurs in the ring about a rotational center of the cross-section, the constant twist occurring at each cross-sectional location of the ring about the circumference of the ring and between adjacent free ends of the ring; and
- an oil control ring positioned in a lower one of the ring grooves, the oil control ring having a face side that forms two points of contact with the cylinder wall.

* * * * *